US010362845B2

(12) United States Patent
Antinone

(10) Patent No.: US 10,362,845 B2
(45) Date of Patent: Jul. 30, 2019

(54) THREE COMPONENT BINDER CLIP FOR USE IN PERSONAL ACCESSORY DESIGNS

(71) Applicant: Lawrence Ernest Antinone, Ramona, CA (US)

(72) Inventor: Lawrence Ernest Antinone, Ramona, CA (US)

(*) Notice: Subject to any disclaimer, the term of this patent is extended or adjusted under 35 U.S.C. 154(b) by 1106 days.

(21) Appl. No.: 14/717,445

(22) Filed: May 20, 2015

(65) Prior Publication Data

US 2015/0342313 A1    Dec. 3, 2015

Related U.S. Application Data

(60) Provisional application No. 62/003,516, filed on May 27, 2014.

(51) Int. Cl.
| | |
|---|---|
| *A45C 1/06* | (2006.01) |
| *B42F 1/00* | (2006.01) |
| *G01S 19/13* | (2010.01) |
| *B42F 1/08* | (2006.01) |
| *G01S 19/16* | (2010.01) |
| *G01S 19/35* | (2010.01) |

(52) U.S. Cl.
CPC ............... *A45C 1/06* (2013.01); *B42F 1/006* (2013.01); *B42F 1/08* (2013.01); *G01S 19/13* (2013.01); *G01S 19/16* (2013.01); *G01S 19/35* (2013.01); *A45C 2001/062* (2013.01); *A45C 2001/065* (2013.01); *Y10T 24/204* (2015.01)

(58) Field of Classification Search
CPC ............... Y10T 24/203; Y10T 24/204; Y10T 24/44875; Y10T 24/4488; A45C 2001/065; A45C 2001/062; A45C 1/06; B42F 1/08; B42F 1/006
See application file for complete search history.

(56) References Cited

U.S. PATENT DOCUMENTS

| | | | |
|---|---|---|---|
| 4,332,060 A | 6/1982 | Sato | |
| 5,249,437 A | 10/1993 | Cole, Jr. | |
| 6,327,749 B1 | 12/2001 | Antinone | |
| 6,732,419 B2 | 5/2004 | Davis | |
| 7,120,970 B2 | 10/2006 | Thomson et al. | |
| 7,318,293 B2 | 1/2008 | Ardern, II | |
| 7,334,616 B2 | 2/2008 | Kaminski | |
| 8,240,010 B2 | 8/2012 | O'Donnell | |
| 8,914,949 B2 | 12/2014 | Thomson et al. | |
| 2010/0230018 A1* | 9/2010 | Nielsen | A45C 13/185 150/102 |
| 2011/0047762 A1 | 3/2011 | O'Donnell | |

* cited by examiner

*Primary Examiner* — Abigail E Troy
(74) *Attorney, Agent, or Firm* — Mark Wisnosky

(57) ABSTRACT

A clip suitable for holding money, credit cards and document is described. The clip includes features that enable use of decorative leather, cloth, rubber, polyester or polyurethane covers that can be interchanged and conceal the inner, typical metal, workings of the clip. The clip further includes features that allow control of positioning of the lever arms of the clip for ease of use as a money clip and expansion of the use as a stand for electronic devices.

4 Claims, 18 Drawing Sheets

THREE COMPONENT BINDER CLIP FOR USE IN PERSONAL ACCESSORY DESIGNS

CROSS-REFERENCE TO RELATED APPLICATIONS

This application claims the benefit of U.S. Provisional Patent Applications 62/003,516, filed May 27, 2014, titled "Binder Clip Style Mechanism, with 360 Degree Rotating Wire Arms, for Use in a Covered Money Clip", and by the same inventor.

BACKGROUND OF THE INVENTION

Technical Field

The present invention relates to spring loaded clips that are used primarily as binder clips and money clips to hold paper currency, credit cards and personal documents.

Related Background Art

There have been many variations of spring-loaded clips to hold paper currency and credit cards. The devices have an advantage over a wallet or purse in that they can keep essential documents organized and are sufficiently compact that they may be carried in one's pocket. Several versions use a commercially available binder clip and add covers or other features to improve the appearance and functionality. Still other approaches use custom designed clips in most case spring loaded in some fashion to create a money clip. There is however room for improvement. The currently available clips do not offer complete control for the motions of the parts of the clip. In particular most clips have some form of a lever arm(s) to open the spring loaded clamp portion to access money, cards or documents. Controlling the movement of these lever arms in practical use is cumbersome. Most prior art systems have no means to "lock" open or for that matter lock closed the lever arms. Motion and control of the position of the lever arms is needed.

Additionally with the continued expansion of smart phone and tablets people are looking for comfortable ways to support these device while in use. Either through for typing or for hands free use. Use of the devices now includes, not just extended interaction for phone, but also use of the devices for reading or watching movies creates a need to hold the devices at an appropriate angle for viewing. A money clip, since it is almost always carried with the user, if it includes appropriate control means to hold particular configurations, makes an ideal and convenient stand for electronic devices.

Aesthetics of the clips cannot be overlooked. There is a need for continued improvement in the appearance of the clips. Providing a means for user preferences such a custom covers and even shapes are needed. Additionally some users have a preference for a clip that completely encases all internal parts of the clip. No prior art devices provide such a feature.

The present invention comprises innovations that address the continued needs of the market for money clips and general purpose spring loaded clips.

DISCLOSURE OF THE INVENTION

The present invention provides a new design for a clip used to hold paper money, credit cards and documents. Although shown in all depictions, as sized for a pocket money clip the invention can be sized larger to hold larger documents. Its usefulness is not limited to a money clip but any application where temporary binding of multiple objects that can be clamped together is required. The device is further useful as a stand for portable electronic devices. The invention includes new designs for a spring member that includes options to change the tension of the spring to make the clip easier or harder to open and apply different forces on the material bound within the clip. New designs for arms to actuate the spring member are also included. The spring and the arm include a connection system that allows interchangeability of the spring and/or arms. The connection means further includes means to control the movement of the arms. The controlled movement can include a motion where the arms require a constant pressure to move, one where the arms require varying tension to move depending on the angle and a motion where the arms are temporarily locked at particular angles. The invention further includes decorative covers for the arms and the ability to have the covers assume different shapes. The invention further includes interior pockets in which electronic devices may be secured for loss prevention and any near field wireless communication with other electronic devices.

DETAILED DESCRIPTION

Figure 1:
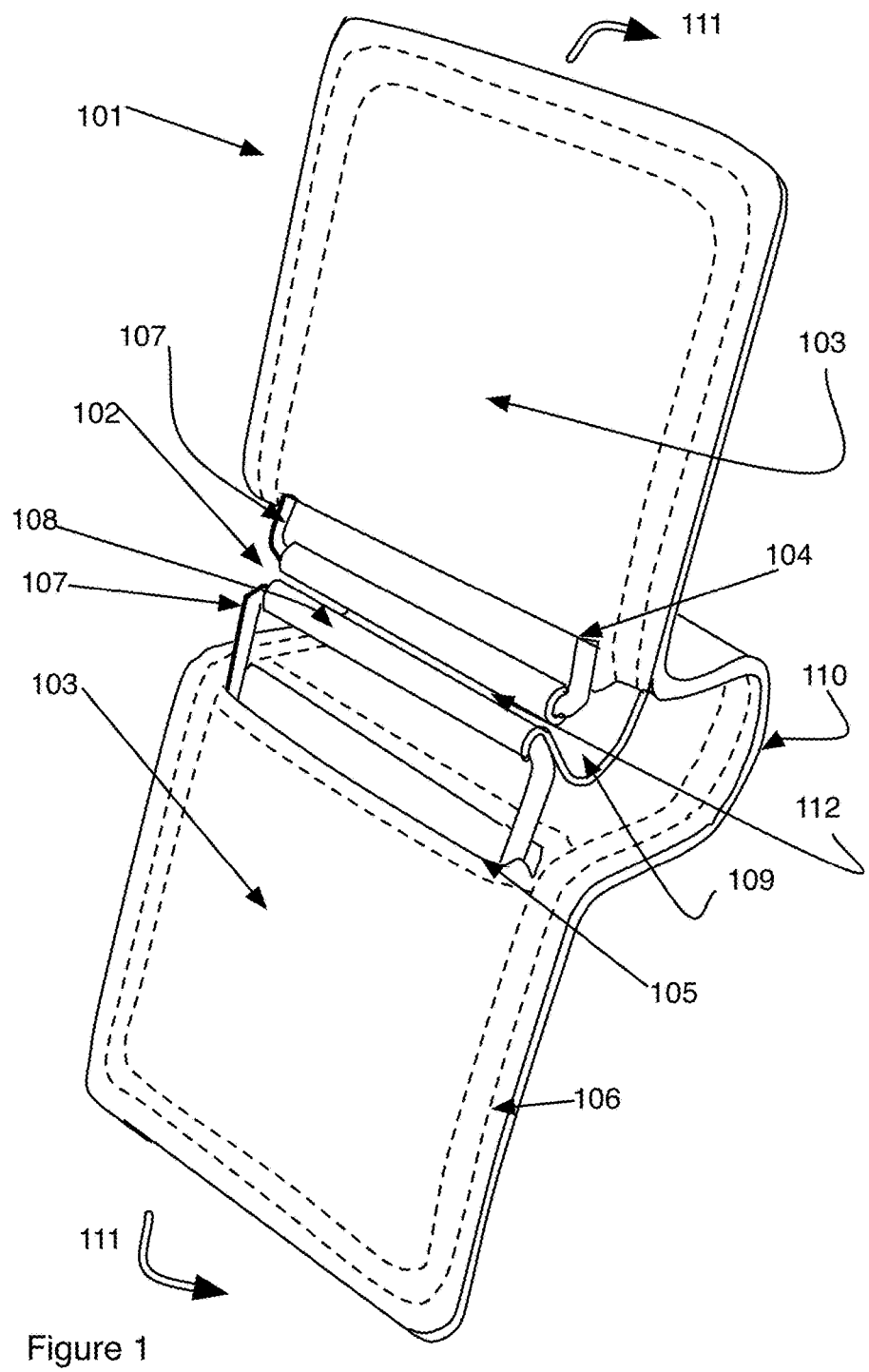
FIG. 1 shows a clip according to the present invention.

FIG. 1 shows a view of a first embodiment of the invented clip. The clip 101 is comprised of three parts, an interior spring component 102, lever arms 107, and a cover component 103. The interior component 102 includes a flat curved spring component 109 the ends of which are rolled into cylinders 108 that are used to removably secure the ends of the lever arms 107. Paper money, documents and credit cards (not shown) are removably held in the space 112 between the two rolled ends 108 of the interior spring component being held in place both by spring tension of the spring 109, forcing the rolled ends together and by forces exerted by the cover components 103, when the lever arms 107 are folded down (shown in later Figures) and by pressure exerted by the lever arms by virtue of control mechanisms built into the rolled ends 108 of the interior spring component, as described in detail in later Figures. In a preferred embodiment the spring component is made of a spring metal plate. In other embodiments the spring component can be made of plastic or any other material that can be formed into a shape similar to that shown here and in subsequent Figures, be deformed, and spring back to its original undeformed shape. The cover 103 is essentially a flat piece of material or in the example shown two flat pieces of material stitched 106 together. The cover includes pockets 104, 105 into which the lever arms 107 of the spring component 102 are inserted. The central portion 110 of the cover extends over the spring component 109 of the interior spring component. The invented clip 101 is shown in FIG. 1 in an open position. The clip may be further opened by exerting pressure on the faces of the cover 103 thereby rotating them in the directions 111 that results in the lever arms increasing the space 112 between the rolled ends 108 for insertion or removal of material held between the rolled ends 108. Note that the pressure upon the spring 109 is exerted by the backside of the cover pieces 103 and not by the lever arms 107. This embodiment of the invented clip is therefore a three-component system, wherein the spring is actuated by rotation of the lever arms, and the cover on the lever arms presses against the spring to actuate the spring. Without the cover the lever arms rotate about the spring without actuating the spring.

In one embodiment the lever arms are held within the pockets 104, 105 by a friction fit. The interior spring component 102 can thereby be separated from the cover. Covers may be interchanged for decorative or fashion purposes or as they wear from use.

Figure 2:
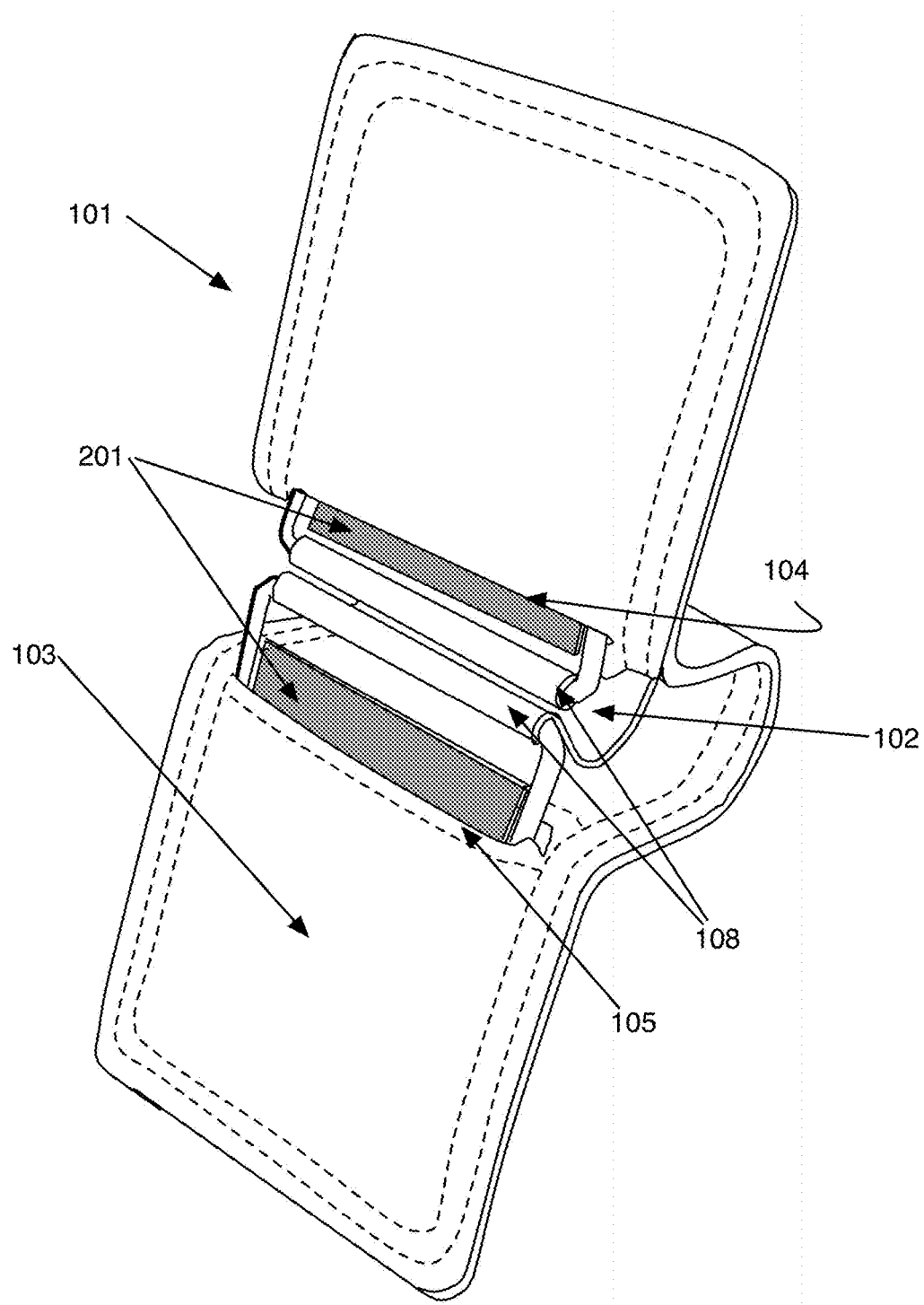
FIG. 2 shows the clip of FIG. 1 further including inserts.

In another embodiment shown in FIG. 2 the clip 101 further includes items 201 inserted into the pockets 104, 105 of the cover 103. The items may be documents or other personal items that are to be separated from the components stored by clamping between the rolled ends 108 of the interior spring component 102. The items may also be spacers to prevent impressions of the lever arms 107 showing through the cover 103. In a preferred embodiment the items 201 are electronic items such as rf-id tags or near field communication devices that can be used to electronically secure the clip 101 to the person of the user by communicating with an electronic device held on the person and setting of an alarm if the clip becomes separated from the person and the electronic device held by the person. In another embodiment the electronic items 201 can include global positioning capabilities as well as communication capabilities to aid in finding the clip if lost. In another embodiment the electronic items 201 include a GPS locator with bluetooth and/or wifi and/or near field communication radios to communicate to a paired device. In another embodiment the items 201 are RF shields forming a faraday cage to prevent communication with electronic items held within the clip.

Figure 3:
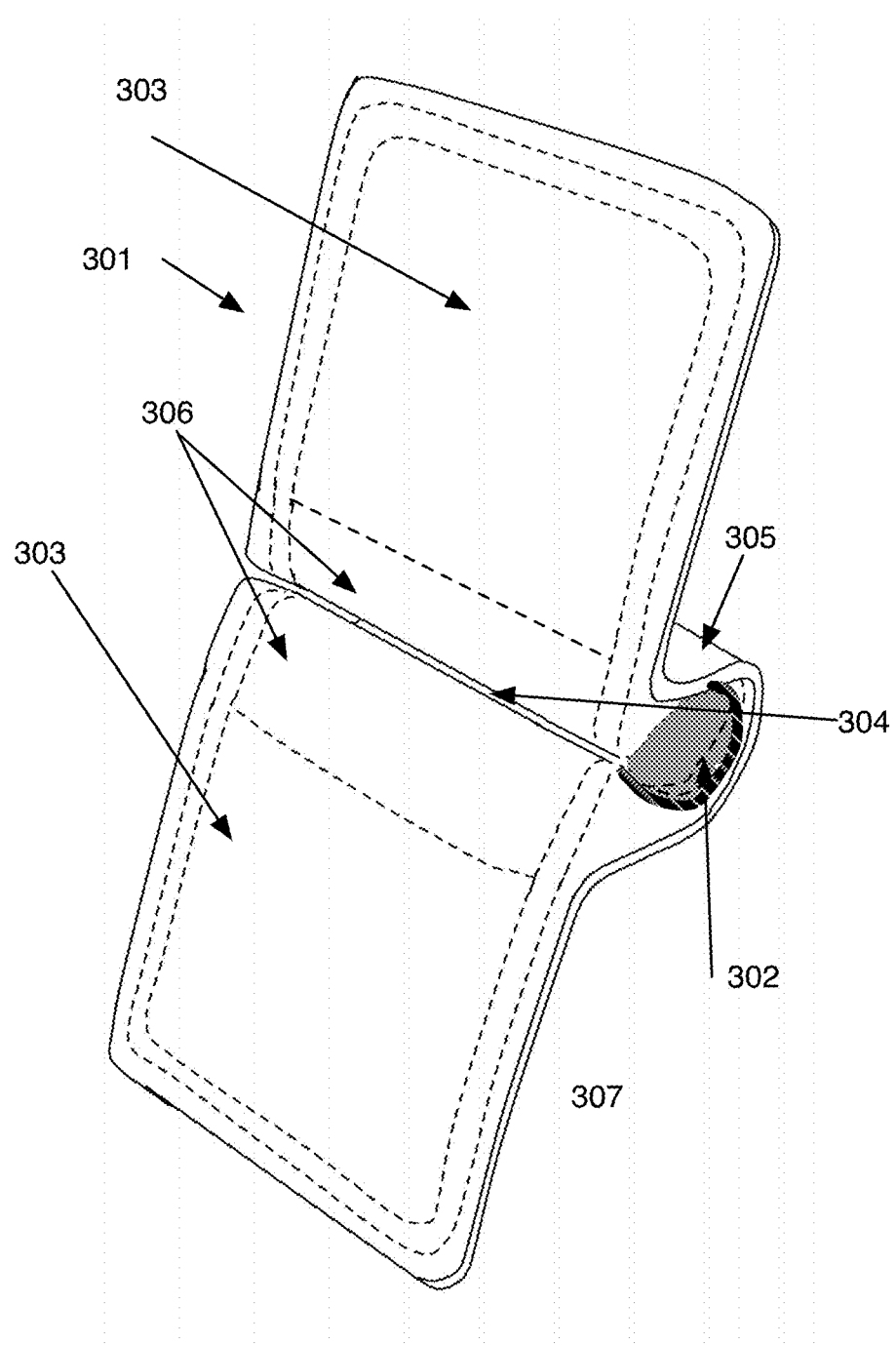
FIG. 3 shows an embodiment of the clip where the interior components are fully encased in a cover.

In another embodiment shown in FIG. 3, the clip 301 includes additional material that completely covers the interior spring component of the clip. In a preferred embodiment the material is a stretchable fabric that is sewn to the covers 303 in the regions 306 as shown, thereby covering the spring component, the rolled ends of the spring component and the lever arms but still allowing access the gap 304 between the rolled ends now covered with the stretchable fabric. In one embodiment the fabric is rubberized to increase the grip of the clip on items held in the gap 304. In this embodiment electronic items 201 are not completely obscured behind the fabric elements 306 making them more secure.

Figure 4:
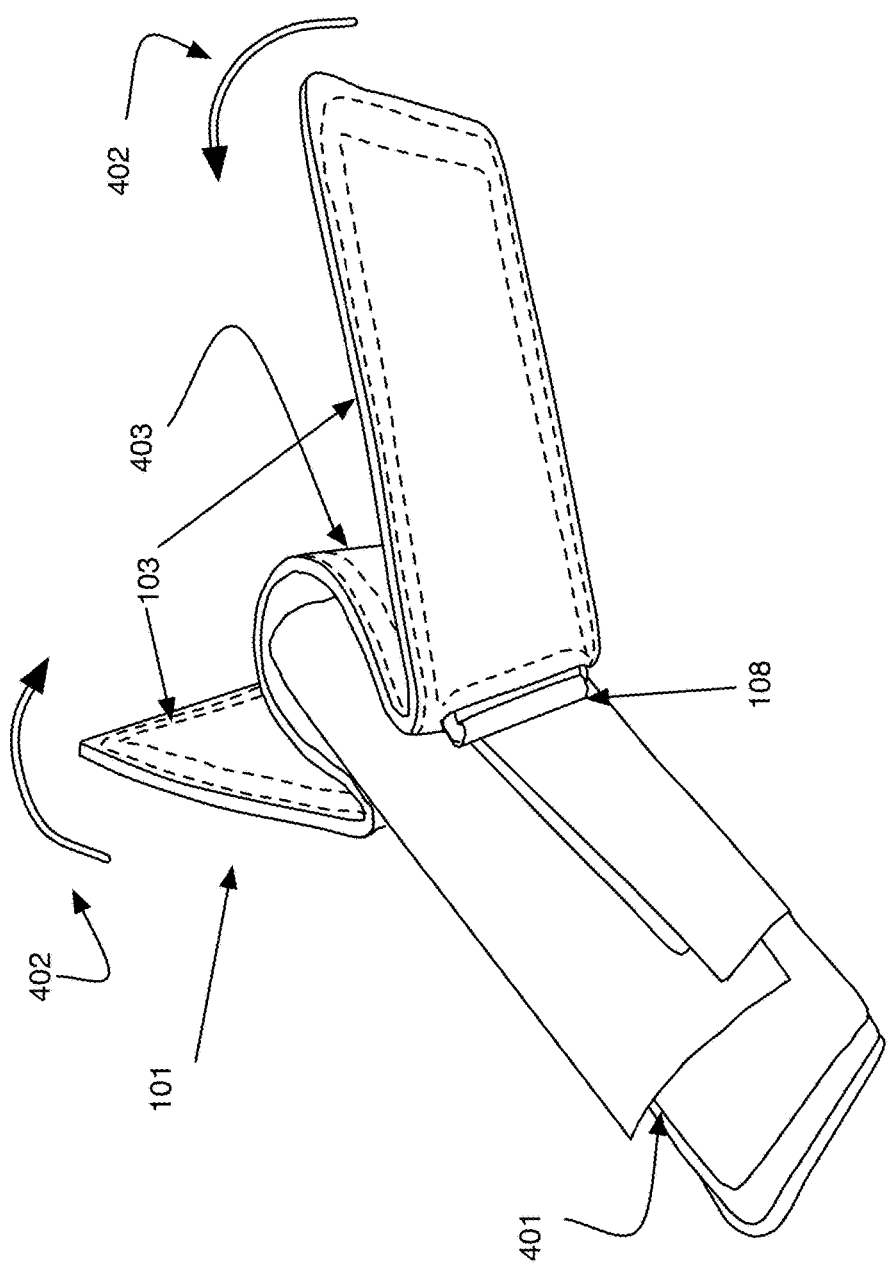
FIG. 4 shows a clip in an open position.

FIG. 4 shows the clip 101 in what is herein defined as the open position. The open position is used to access the contents 410 held securely and removably within the clip by compressing between the rolled ends 108. The clip is opened by rotation of the arms 103 in the direction 402. The covers on the arms 103 press against the cover on the spring clip, thereby pulling the rolled ends 108 apart and releasing the material 401, that is clamped between the rolled ends 108. The resistance to the motion 402 is determined by the length of the lever arms contained in the internal spring component and the stiffness of the spring in the internal spring component.

Figure 5:
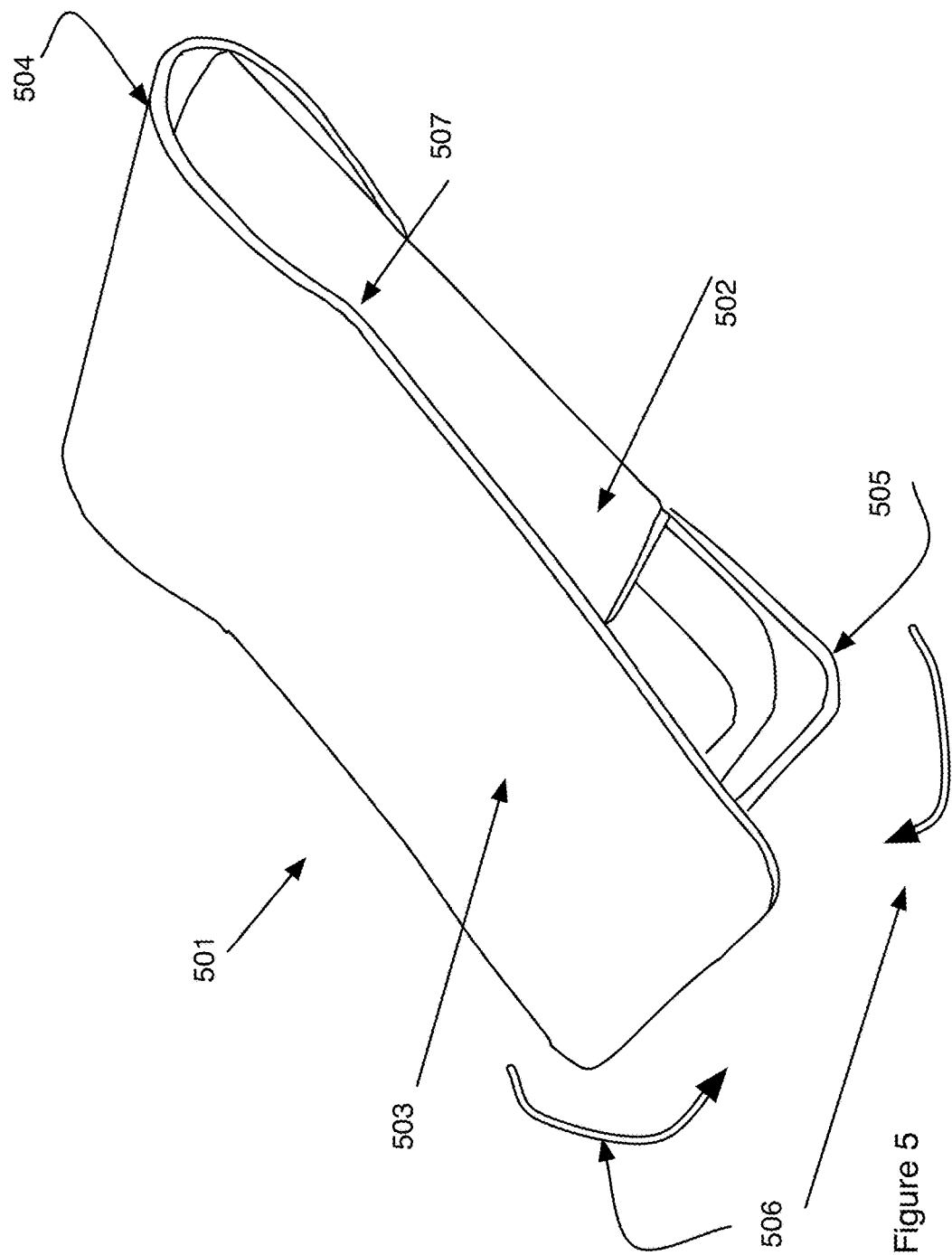
FIG. 5 shows a clip in a closed position.

FIG. 5 shows the clip 501 in a closed position, the arms 503, 505 are folded downward in the direction 506 as shown. The covered spring portion 504 exerts pressure on the rolled ends (not visible in this image) clamping the contents 502 at the point 507. In another embodiment the motion of the arms 503, 505 is controlled such that the arms are either spring loaded to press in the direction 506 or include a detaining system to hold the arms 503, 505 and press against the content 502. The means to control the motion of the arms is shown in detail in later Figures.

Figure 6:
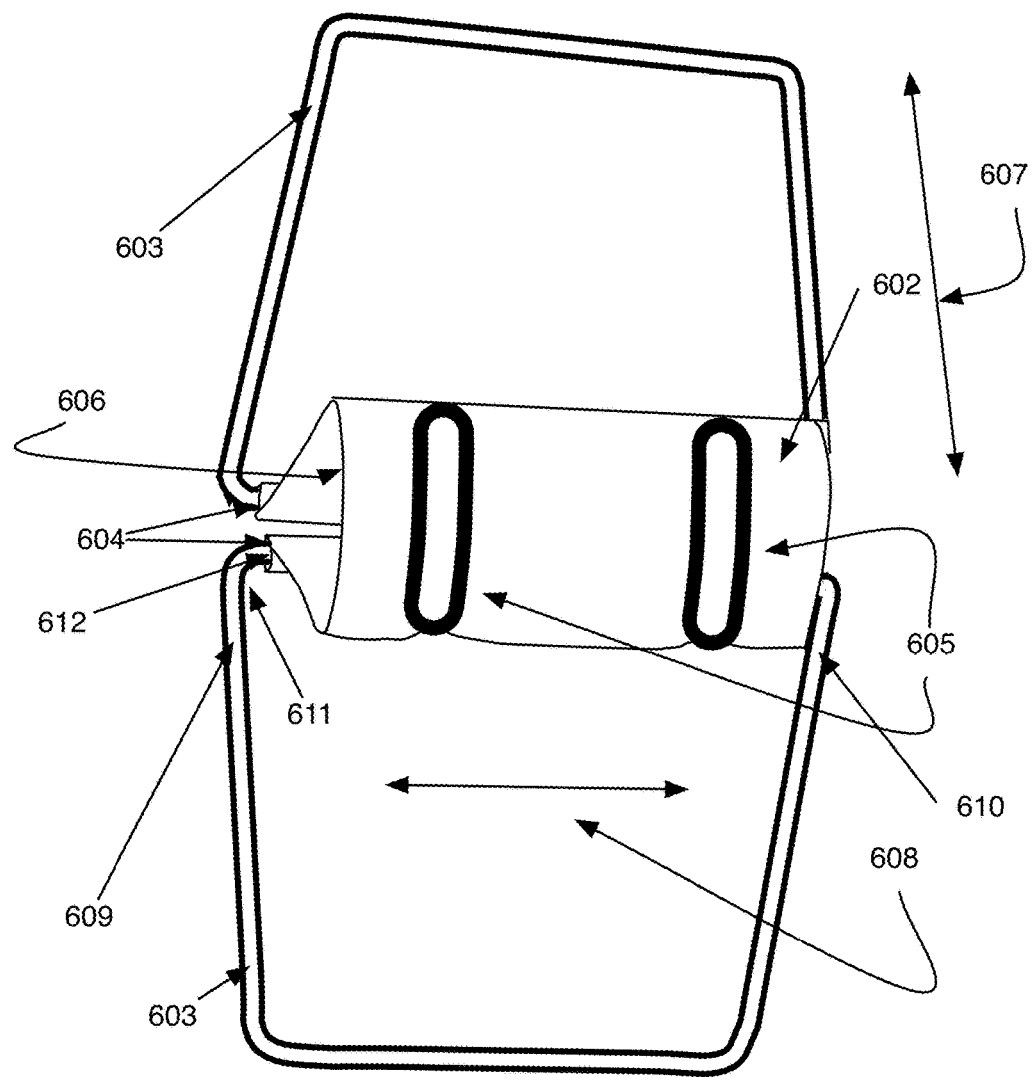
FIG. 6 shows details of the interior components of the clip.

FIG. 6 shows details of an embodiment of the internal spring component of the clip design. The internal spring component 601 is comprised of an essentially rectangular plate 602, that is bent to form a rounded upper spring portion 606. The ends of the rectangle are bent together and rolled to form receptacle tubes 604 for wire arms 603. The wire arms are bent in the nonlimiting example shown into rectangular shapes. Other shapes may be formed for aesthetic and functionality purposes. The details of the wire arms are shown in a later Figure. In one embodiment the upper portion of the plate 602 further includes indentations 605, that stiffen the spring making it clamp with more force at the rolled ends 604, and also offering more resistance in the opening motion as described above in FIG. 4. The resistance to opening is also determined by the length 607 of the lever arms. A longer lever arm providing more leverage and thereby reducing the force required to open the clip. The wire lever arms are constructed such that there is a tension along the direction 608, that causes the sides of the wire arms 609, 610 to exert a spring tension towards one another. The tension is such that the inner edges 611 of the arms rub against the ends 612 of the tubular cylinders to affect the motion of the arms as they are rotated.

Figure 7A:
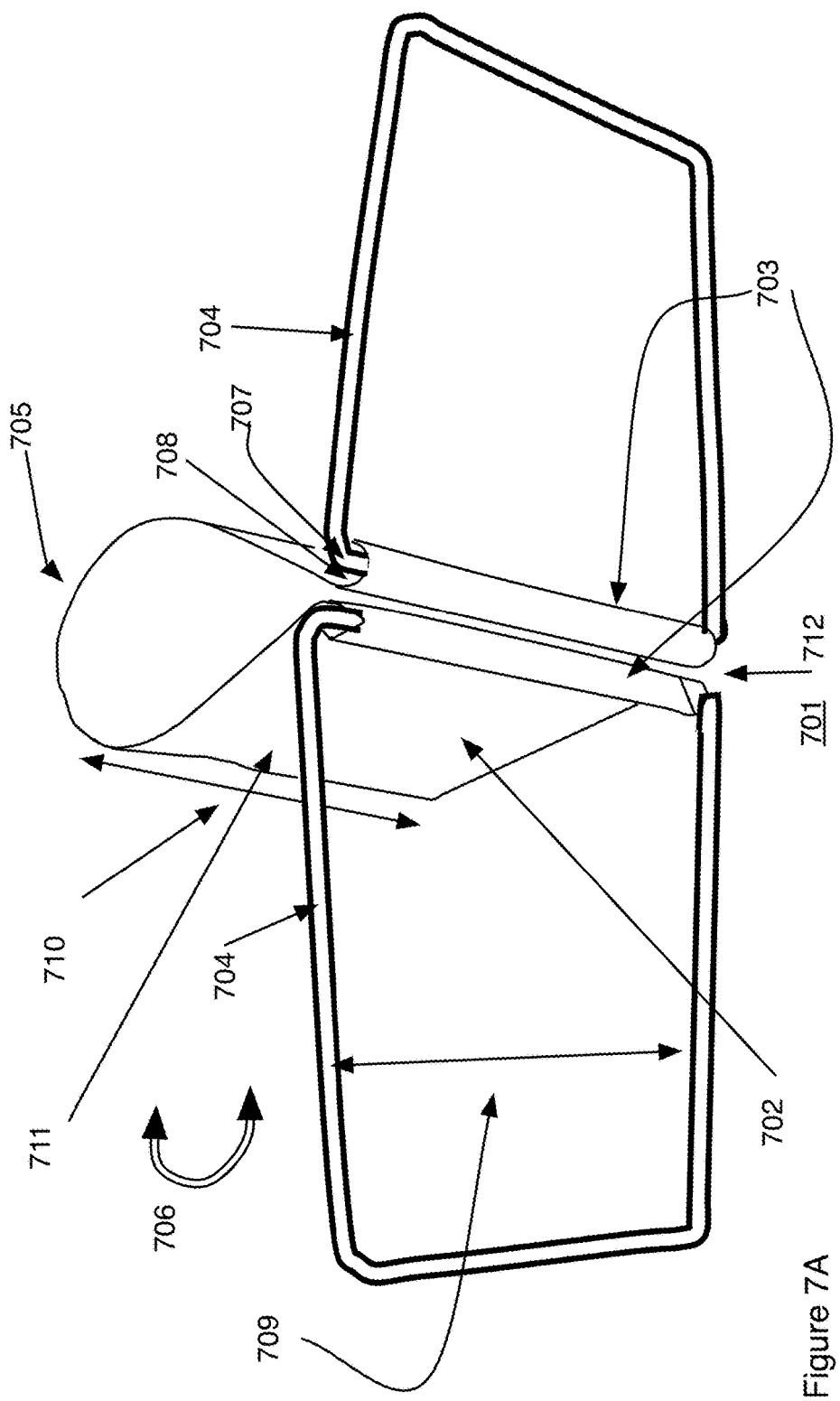
FIG. 7A shows another view of the interior components of the clip.

Referring to FIG. 7A a second view of the internal spring component is shown. The internal spring component 701 is comprised of the rectangular plate 702. The rectangle is folded over so that the shorter ends of the rectangle meet 703, and are rolled to form receiving tubes 708 for ends 707 of the wire arms 704. The upper portion 705 of the flat plate is formed into a curved spring such that it presses together the two receiving tubes 703. Items to be held in the clip are held between the receiving tubes and held in place by the pressure exerted by the spring 705. The arms rotate in the direction 706 as shown. In the preferred embodiment the width 709 of the wire springs is greater than the width 710 of the spring. The wire arms may be rotated completely around the plate 702. Leverage for opening the spring 702 when the arms are rotated comes from a cover (not shown here) over the spring arms, and the cover pressing against the side 711 of the plate, thereby acting as a lever to pull the rolled ends 703 apart and enlarge the opening 712 between the rolled ends, to allow insertion or removal of items into or out of the clip.

Figure 7B:
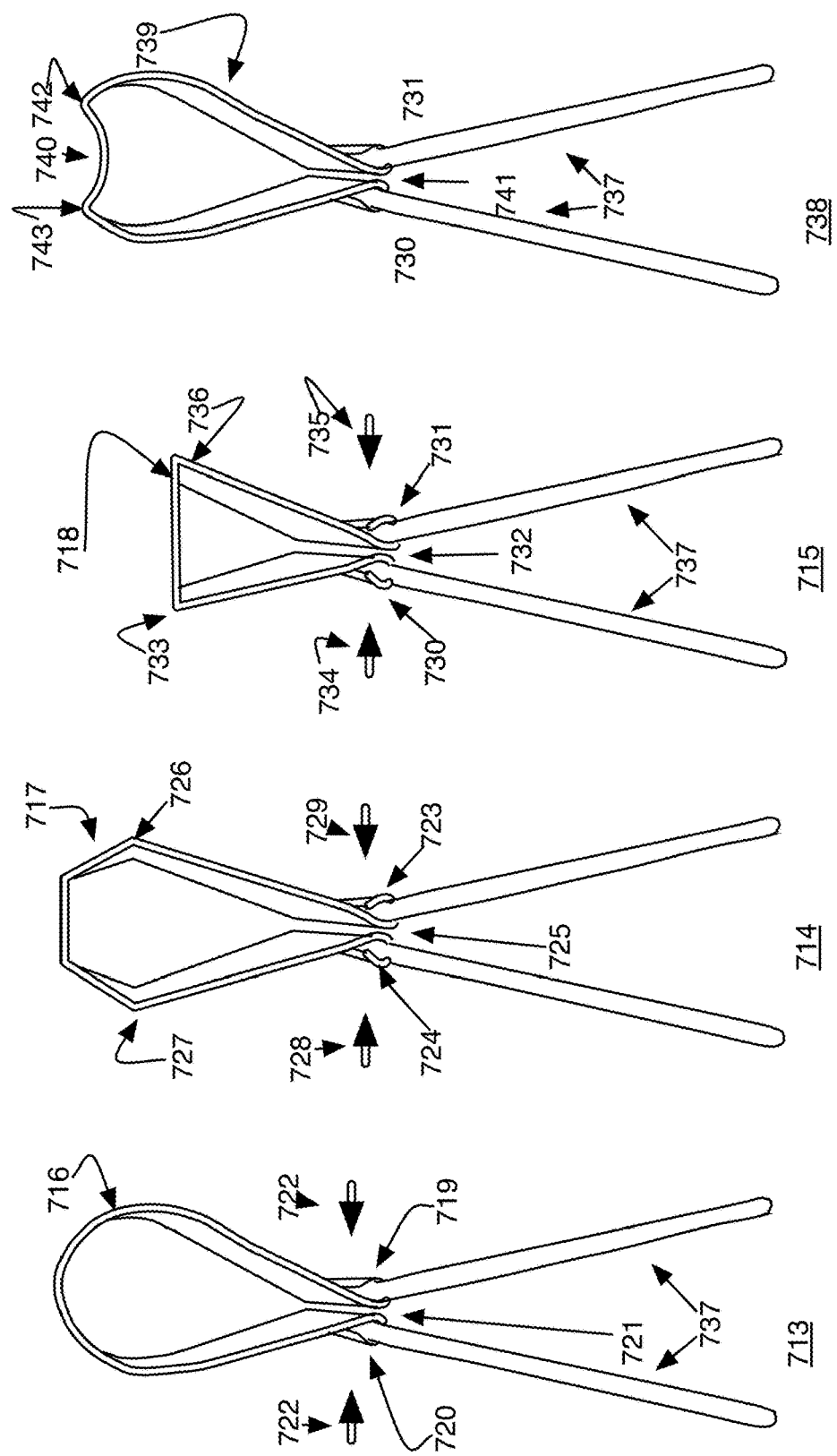
FIG. 7B shows three embodiments of the shape of the spring component of the clip.

Referring to FIG. 7B, the spring component 716, 717, 718, 739 of the clip is shown in three views 713, 714, 715, 738. The first spring component 716 in the first view 713, shows a version in which the spring component is formed into a rounded shape. The ends 719, 720 are bent towards one another, leaving a gap 721 in which items to be held in the clip are clamped. In the preferred embodiment the spring 716 is formed so there is residual tension in the direction 722, that results in a force clamping on items held within the gap 721. The spring component 716 in a preferred embodiment is made of metal and begins as a flat plate, as shown in later Figures and is formed into the shape 716. Forming includes rolling the ends 719, 720 to form channels for the lever arms 737. The spring component is bent into a shape as shown in the views of FIG. 7B. The bent spring component has a cross-sectional shape shown variously as a rounded cross-sectional shape 713, a five sided or pentagonal cross-sectional shape 717, a triangular cross-sectional shape 718. In another embodiment the spring component is made of plastic or other non-ferrous materials and is molded into the shape 716. Molding includes the formation of the ends 719, 720 as shown.

In a preferred embodiment 714, the spring component is formed into five sided shape 717. The addition of the corners 726, 727 enables an increase in the tension forces 728, 729 over the forces 722 in the first view 713, with the rounded shape for the spring component 716. The shape includes the ends 723, 724 that form the gap 725 between which items to be held in the clip are clamped. The advantage of the five sided shape is that it allows for increased tension 728, 729, without creating overly sharp corners 725, 726.

By contrast another embodiment 715 includes a triangular cross-sectional shape spring component 718, that also increases the clamping forces 734, 735 over that available on the rounded version 713. However it is seen that the corners 733, 736 are much sharper than the corners 726, 727 shown in the five sided version 714. The corners in the five sided version 714 provide an improved feel to that of the three sided version 715. In some cases however the increased tension 734, 735 of the three sided version 715 is required, if for example the material used for the spring component 718, is such that insufficient tension results from the other versions 713, 714. The three sided version 715 otherwise works as the others, having ends 730, 731 that are formed to create channels (not labeled), for the lever arms 737.

In another embodiment shown in view 738, the rounded cross sectional shape 739, further includes an indentation 740. The indentation producing sharpened points 742, 743, that enable closing of the gap 741 and increased tension on items (not shown) to be held in the gap 741.

In further embodiments, not shown, the shape of the spring component can include 4, 6, 7, 8 and more sided versions created equivalently to the three-sided 715 and five-sided 714 versions shown in FIG. 7B.

Figure 8:
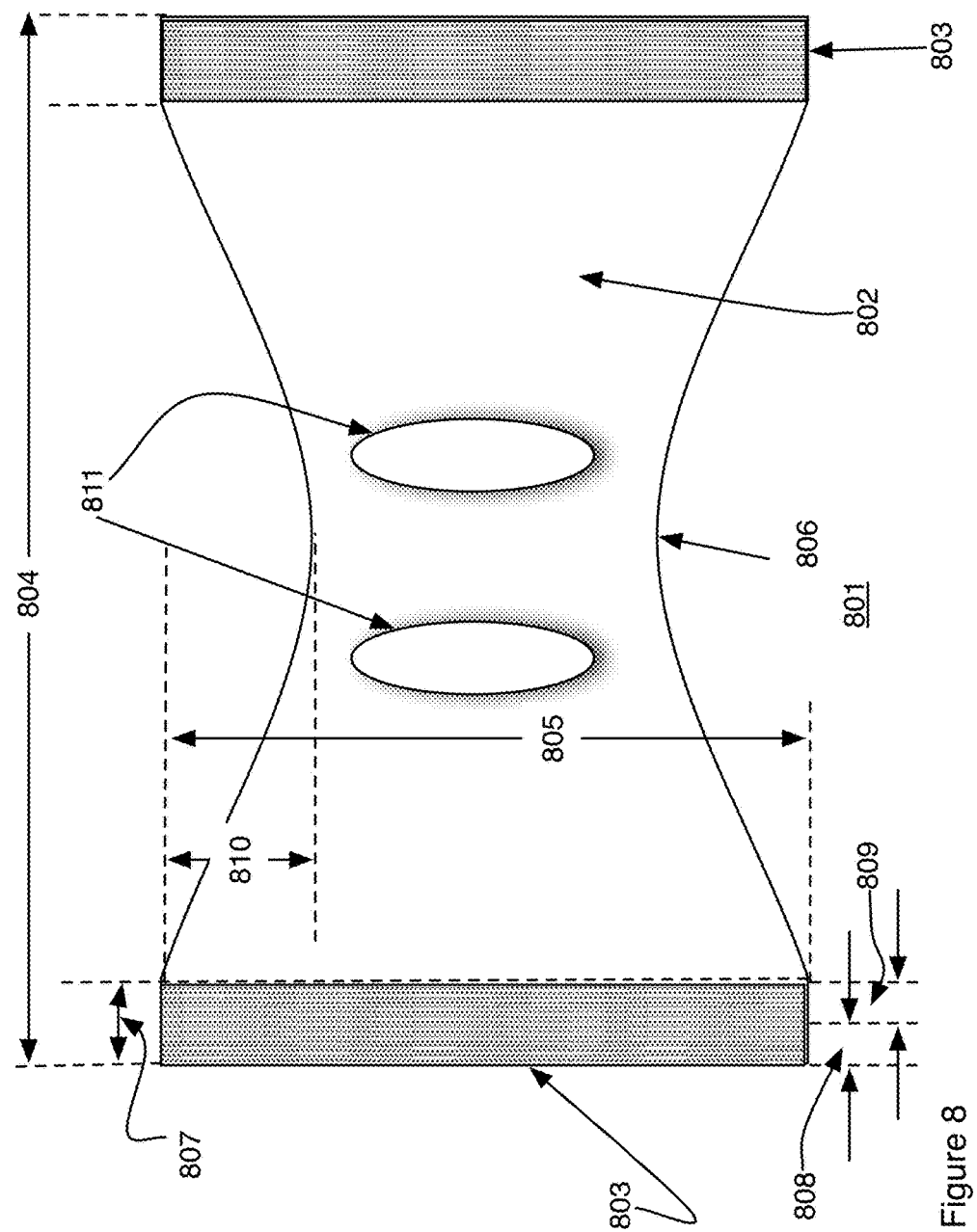
FIG. 8 shows details of the spring component of the interior components of the clip.

An embodiment of the plate used in the internal spring component is shown in FIG. 8. The plate 801 is rectangular having a width 805 and a length 804. The plate in this embodiment is narrowed at the midsection 806 by an amount 810. The narrowing of the plate reduces the spring force required for opening the clip. That is a larger narrowing or larger dimension for 810 reduces the spring force. The plate is divided into two regions. The central region 802 is formed into a curved spring by bending the ends 803 towards one another. The end regions 803 are rolled to form tubular channels as shown in the previous two figures that receive the wire arm components of the internal spring component of the clip. The end regions have a width 807 and a length 805. The width 807 of the end regions determines the diameter of the tubular channels and is selected to accommodate the diameter of the wire arms. The width 807 is selected such that the wire arms are held securely within the tubular channels when formed but also sufficiently large that the tubular channels allow the wire arms to be rotated. The end regions are themselves further divided into two 808 and 809 each having a width (shown but not numbered). The first region 808 controls the motion behavior of the lever arms of the clip in the open position and the second region 809 controls the motion behavior of the lever arms of the clip in the closed position. Motion behavior implies the force required to move the lever arms of the clip when in the neighborhood of the open or closed position and whether the lever arms of the clip snaps to a position or is removably detained in a position as will be clearer in subsequent figures. In another embodiment the internal spring component further includes indentations 811 that act as stiffeners. The stiffeners 811 may be either indentations in the plate 802 or bumps, The stiffeners may be oriented as shown or perpendicular to that shown as depicted in FIG. 6.

Figure 9:
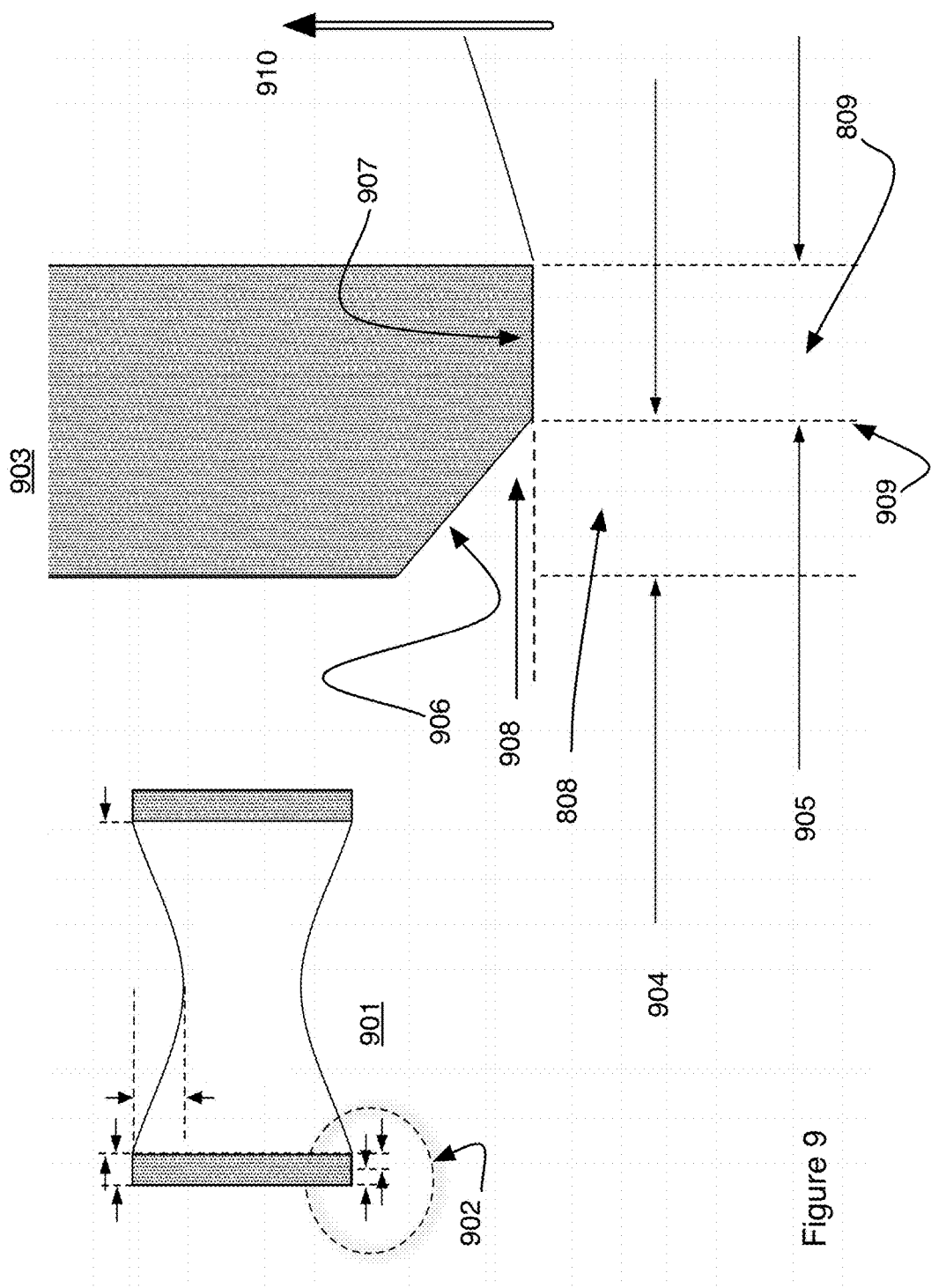
FIG. 9 shows details of the spring component that are used to control motion of the lever arms.

FIG. 9 shows further details of the spring component 901 with an expanded view 903 of the end region 902 of the plate 901. The two regions 808, 809 are shown that control motion relative to opening and closing the clip by moving of the wire lever arms. Note the entire region including 808, 809 is rolled into a cylinder that receives the ends of the lever arms. The region as shown is flat as it would be prior to rolling and the edges are cut as shown prior to rolling into a cylinder for ease in manufacturing. The tension on the wire arms insert is in the direction 910 and in the opposite direction at the other end (detail not shown). The first region 808 has been cut to a sloped edge 906 that the edge of the wire insert of the internal spring component will rub against as the wire insert is rotated from open to closed position. The slope as shown will result in decreased tension as the wire is rotated to the open position giving a feel of the lever arms springing open. The second region 809 has a flat surface 907 that the wire arms will rub against as the wire arms are rotated. The region 809 and the surface 907 affect the behavior of the wire arms when being moved near the closed position. The flat edge 907 surface will provide a constant frictional force of the wire as it is moved. The combination as shown of the two surfaces results in a feel as the wire arms of the clip is rotated from the closed to the open position of a constant resistance while the arms are in contact with surface 907 until the arms are rotated to contact the surface 906 at point 909 at which point the rotation resistance decreases and the arms will feel to spring to the open position as the ride down the slope 906. The width 904 of the first region 808 and the width 905 of the second region 809 determine the point where the resistance changes from one of constant resistance to springing to the open position. The "point" implies the angle of the arms of the clip as they are rotated from closed to open.

Figure 10:
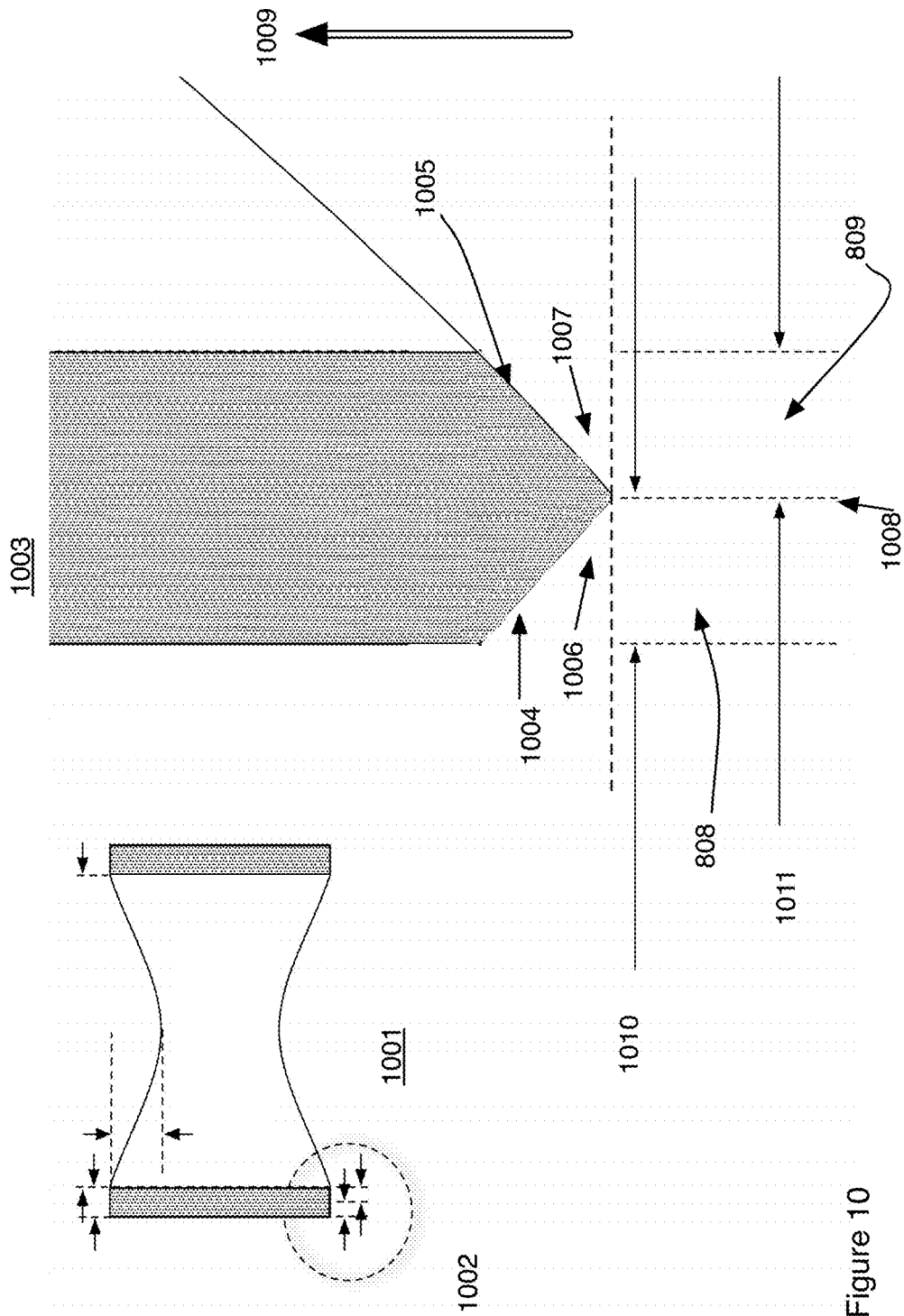
FIG. 10 shows details of another embodiment the spring component that are used to control motion of the lever arms.

Referring to FIG. 10, a second configuration of the edges on the plate in the "control region" is shown. As for FIG. 9 the first view 1001 shows the plate of the internal spring component and attention is focused on the region 1002 with an expanded view 1003. In this example the first region 808 that controls the movement of the lever arms near the open position and the second region 809 that controls the movement of the lever arms near the closed position both have sloped surfaces 1004, 1005. The behavior with such a configuration is that the lever arms spring both to a closed position and to an open position with increased tension on the arms as they are rotated from closed to open until the arms reach the extended point 1008 at which point tension reduces as the arms ride down the slope 1005. Tension on the arm is in the direction 1009. The angles 1006, 1007 of the sloped regions determines the amount of resistance felt as the arms are rotated. A steeper angle results in more rapid increase in the resistance to movement as the lever arms are rotated from open to closed (or vice versa). The location of the point 1008 and the widths of the regions 1010, 1011 determine at which point along the rotation the lever arms will snap from open to closed or vice versa. These same dimensions also thereby determine the equilibrium positions for the lever arms in the open and closed position. In one embodiment the dimensions are selected such that the lever arms press against one another in the closed position and exert a pressure to hold the contents of the clip in place. In a preferred embodiment the angles 1006, 1007 are both 30 degrees.

Figure 11:
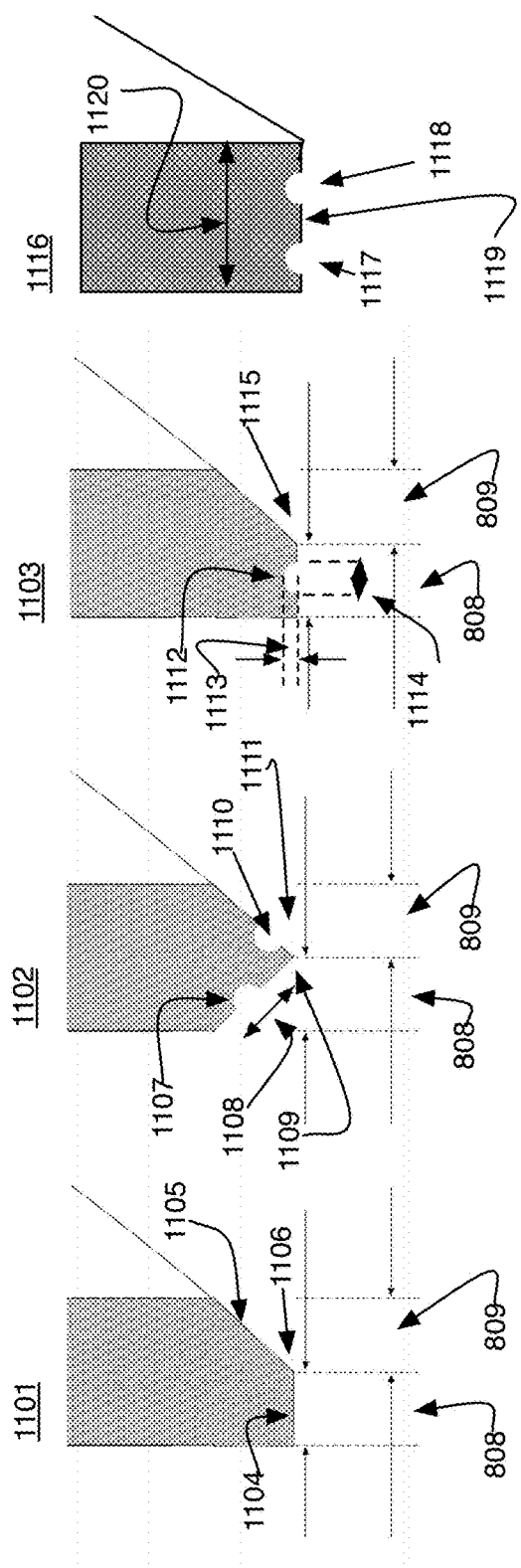
FIG. 11 shows details of additional embodiments of the spring component that are used to control motion of the lever arms.

FIG. 11 shows four additional detail views 1101, 1102, 1103, 1116 of the control region that includes 808, 809. Again the shaded region shown is rolled into a cylinder in the finished product to provide a receptacle for the ends of the wire arms of the internal spring component. Each would provide a different behavior for the lever arms as they are rotated from open to closed and vice versa. In the first view 1101 the lever arm would display a constant resistance to movement as the arms are rotated in the open position and would spring closed as the arms are rotated into region 809 riding down the sloped edge 1105. The amount of spring force that would be felt is determined by the angle 1106.

In another embodiment 1102 the regions 808, 809 are both sloped and further include cutouts 1107, 1110. The tension on the lever arms would result in the lever arms snapping into the cutouts 1107, 1110 such that a second equilibrium position would be attained when the lever arms are held in the cutouts. The position 1108 of the cutouts along the edge determines an angle for the lever arms in this second equilibrium if the clip is, for example, used as a stand for an electronic device as shown in later figures. Once additional force is applied to the lever arms as they are rotated they are forced out of the cutouts and continue to ride the slope surfaces to the ultimate equilibrium positions of fully open or fully closed. The location of the point 1109 determines as before the angle at which the lever arms would reach a maximum of tension and then ride down the slope going either from open to closed or closed to open. And again as already described the angle 1111 determines the spring driving force for moving the lever arms up or down the sloped edges. In a third embodiment view 1103 of this FIG. 11 the first region 808 includes a flat surface and a cutout 1112. The cutout has a depth 1113 and a width 1114. The depth and width of the cutout relative to the diameter of the wire arms determines the force felt by the user in rotating the arms past the cutout region. If the width and depth are smaller than diameter of the wire arms of the internal spring component little effect will be felt by the cutout. If the depth and width are equivalent to or slightly larger than the diameter of the wire arms the arms will snap into the cutout region and provide an intermediate equilibrium position for the arms. In the position shown in the first region 808 the cutout will affect the motion of the lever arms when nearer the open position. The location of the cutout will determine the intermediate equilibrium position of the lever arm. In a fourth embodiment 1116, two cutouts 1117, 1118 are included and the edge 1119 of the control region is not sloped. In this embodiment the rotation of the lever arms would produce a constant pressure along the edge 1119. The lever arms would be removably detained in the cutouts 1117, 1118 as the lever arms are rotated past the cutouts. The position 1120 of the lever cutouts along the edge determines the angle the lever arms will be detained once in the cutout. The position of the first cutout 1117 determines the angle of the lever arms when in an open position and the position of the second cutout 1118 determines the angle of the lever arms in a closed position.

Figure 12:
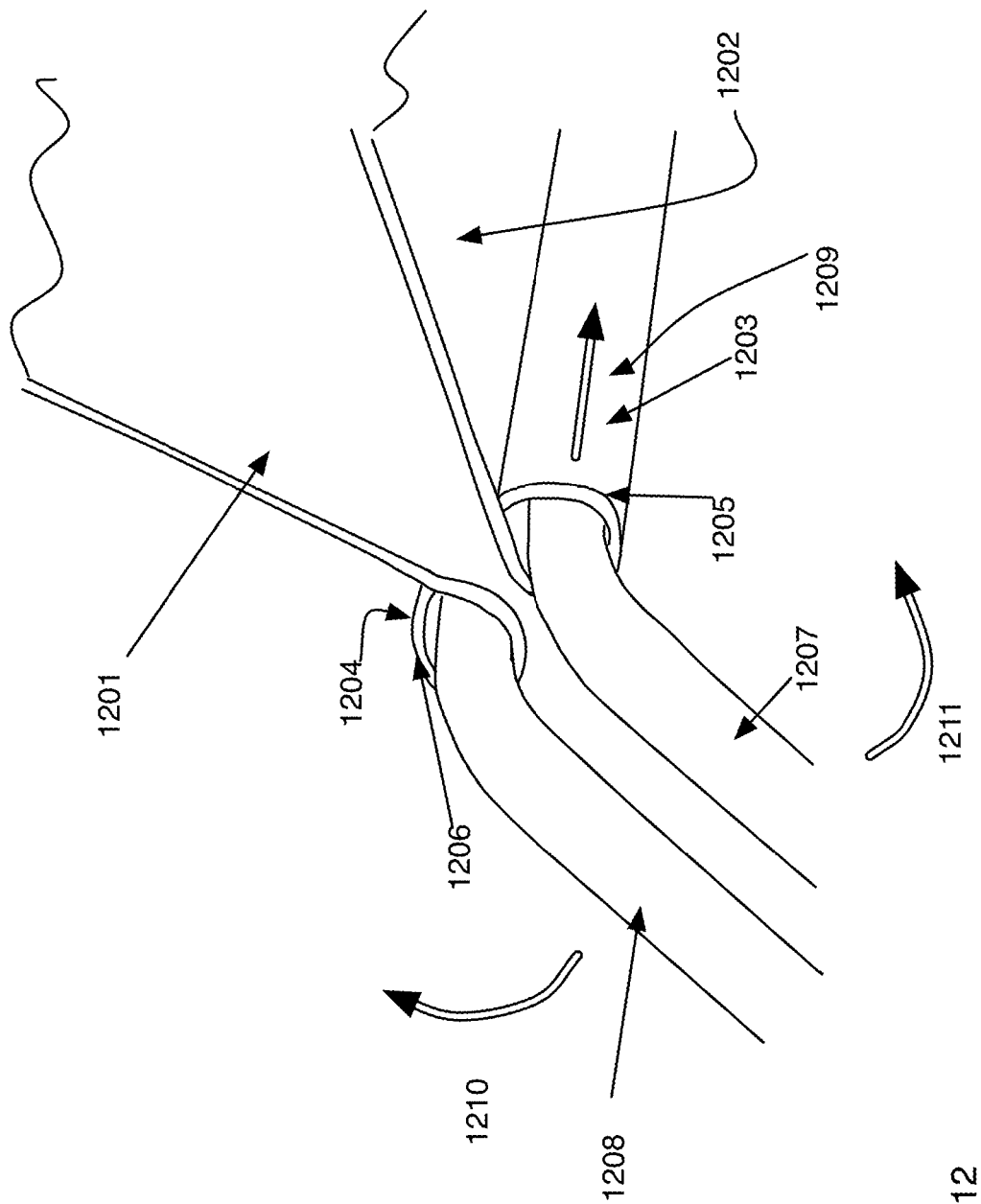
FIG. 12 shows details of embodiments of the spring component that are used to control motion of the lever arms and the lever arms interacting with such embodiments.

Referring now to FIG. 12 a detail view of the end of the inner spring component as discussed in FIGS. 9-11 except that the end is now completed as would be used in the finished clip. The internal spring component includes the flat spring component now bent into a spring configuration with the two ends 1201, 1202 bent together and the ends are rolled to form cylindrical tubes 1203, 1204. The cylindrical tubes are receivers for the ends of the wire lever arms 1207, 1208. The lever arms 1207, 1208 are tensioned in the direction 1209 such that the lever arms are held in the cylindrical tubes 1203, 1204 and the surface of the lever arms (not labeled) rubs against the edges 1204, 1205 that are the ends of the cylindrical tubes. The cut and features incorporated in the edges are as discussed in FIGS. 9-11. In the example of FIG. 12 the edges are shown flat and would result in a constant friction against movement of the lever arms as they are rotated from the closed position (shown in the figure) to an open position by rotation in the directions 1210, 1211 as shown. Note the lever arms rotate independently. That is the first lever arm 1207 can rotate in the direction 1211 while the remaining lever arm 1208 remains in the position shown.

In another embodiment the lever arms are not tensioned in the directions 1210, 1211 but rather rotate freely about the flat spring component comprised of walls 1201, 1202.

Figure 13:
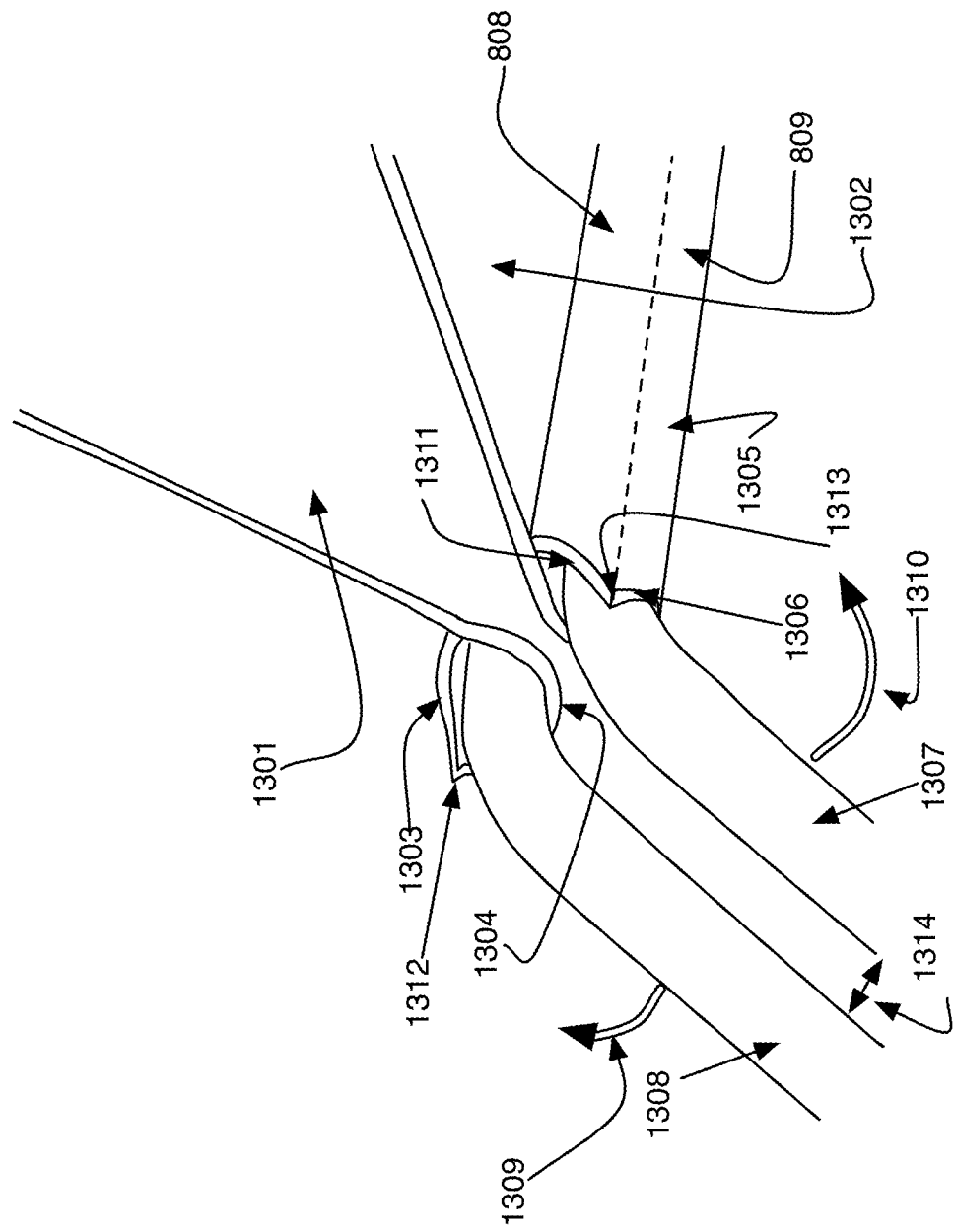
FIG. 13 shows a second variation of the embodiments of FIG. 12.

Referring to FIG. 13 the details of the end of the internal spring component are shown similarly to FIG. 12 except in this case there is a structure to the ends of the cylindrical tubes that further affects the motion of the wire lever arms 1307, 1308. The structure is the same as that shown in FIG. 10 view 1003 for the unfinished internal spring component. The lever arms 1308, 1307 of the internal spring component 1301 are shown in the closed position the regions 808, 809 of the ends of flat spring 1302 show that the top of the lever arm 1307 is in the region 809. This further explains the statements that motion of the lever arm in the closed position are affected by the cut of the edge of the region 809. The end regions 808, 809 of the flat spring component 1301 are shown in the finished state that is rolled to form a cylinder 1305 that receives the end of the lever arm 1307, 1308. In the closed position the lever arms are separated by a distance 1314 that is determined by the angle of the cut and the location of the point 1312, 1313 that is the dividing point between the region 808 and region 809. The inner surface of the lever arms is pressed against the surfaces 1304, 1306 by virtue of the tension on the lever arms that holds them within the cylinders 1305 (cylinder on the back side in the view is equivalent but not visible). As the lever arms are rotated towards the open position in the directions 1309, 1310 the inside walls of the lever arms are pressed against the edges 1304, 1306 of the cylinders of the flat spring component and a resistance is felt as the lever arms tension increases as they approach the points 1312, 1313. AS the motion in the direction 1309, 1310 continues the lever arms move past the boundary points 1312, 1313 and into the region 808. The resistance now decreases as the lever arms move down the slopes 1303, 1311 and spring into the open equilibrium position.

Figure 14:
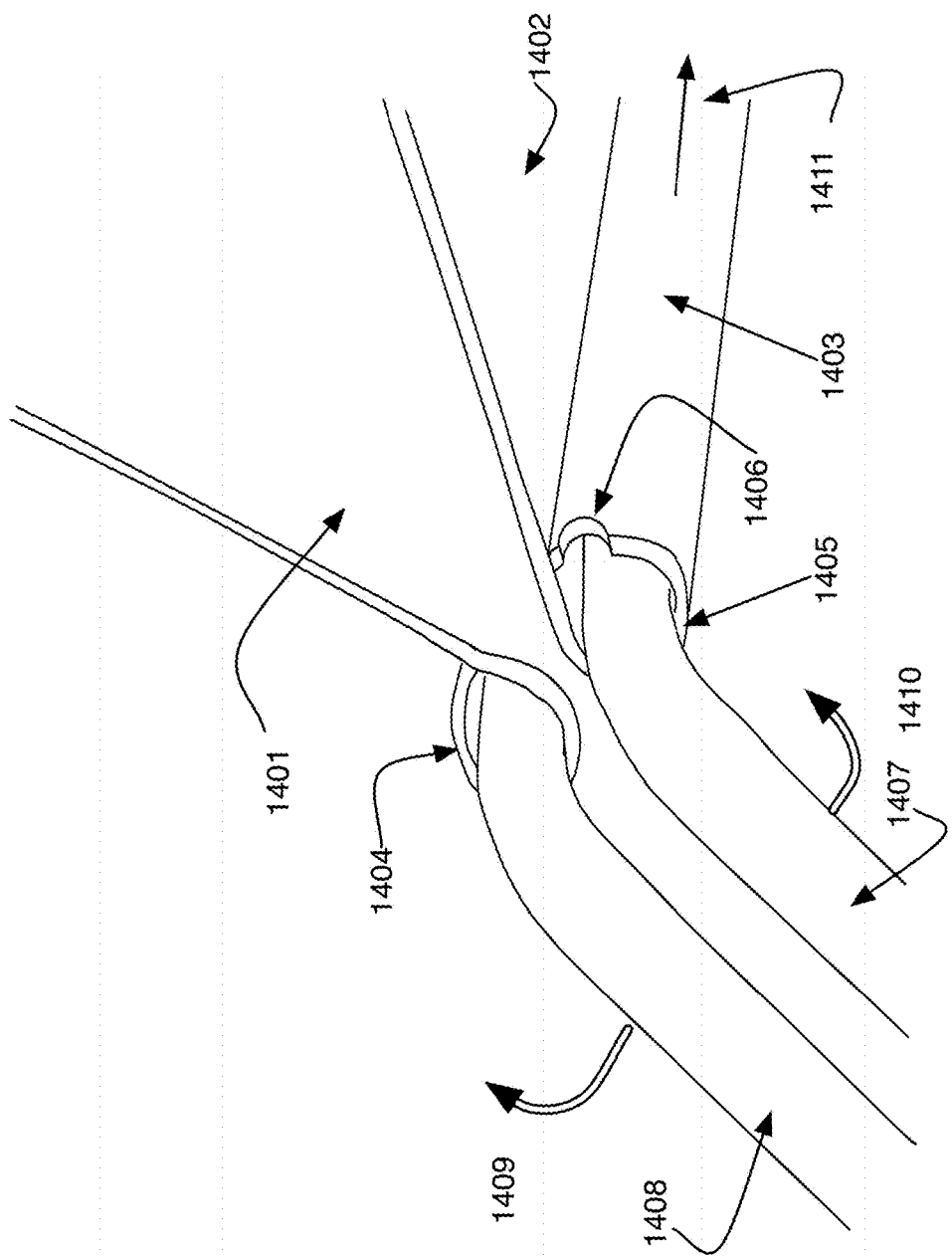
FIG. 14 shows a third variation of the embodiments of FIGS. 12 and 13.

FIG. 14 shows another embodiment of the internal spring component 1401. The end of the flat spring component 1402 is rolled into a cylinder 1403 that receives the bent ends of the lever arms 1407, 1408. The motion 1409, 1410 of the lever arms from the closed to the open position is affected by the finish on the ends 1404, 1405 of the cylinders 1403 (only one visible in the view shown). The figure shows two versions of the finish the lever arms 1407, 1408 will behave differently due to the differences in the features incorporated into the edges 1404, 1405. The first lever arm 1408 will produce a constant resistance with motion 1409 towards the open position due to the fact that the edge 1404 is flat and results in a constant pressure against the lever arm 1408. The second lever arm 1407 will also experience a constant resistance against motion in the direction 1410 of opening until the lever arm is rotated to contact the circular cutout 1406 at which point the spring loading of the lever arm in the direction 1411 will cause the lever arm to snap into the circular cutout 1406 and removably lock into position. The location of the circular cutout 1406 along the edge 1405 determines the angle of the lever arm 1407 when it locks into the position (see also for example FIG. 17 and the discussion for exemplary use of this feature). The lever arm can be moved out of the removably locked position by exerting additional pressure in rotating the lever arm either in the direction 1410 or a direction opposite to that shown to reclose the lever arm. The amount of additional pressure required to move the lever arm out of the cutout 1406 is determined by the width and depth of the circular cutout relative to the width of the lever arm 1407.

The spring component as shown in FIGS. 8-14 in a preferred embodiment is made of metal and the bent and rolled into the final shapes as described. In another embodiment the spring component is made of plastic and the spring component is molded into the final shape that includes the rolled ends.

Figure 15:
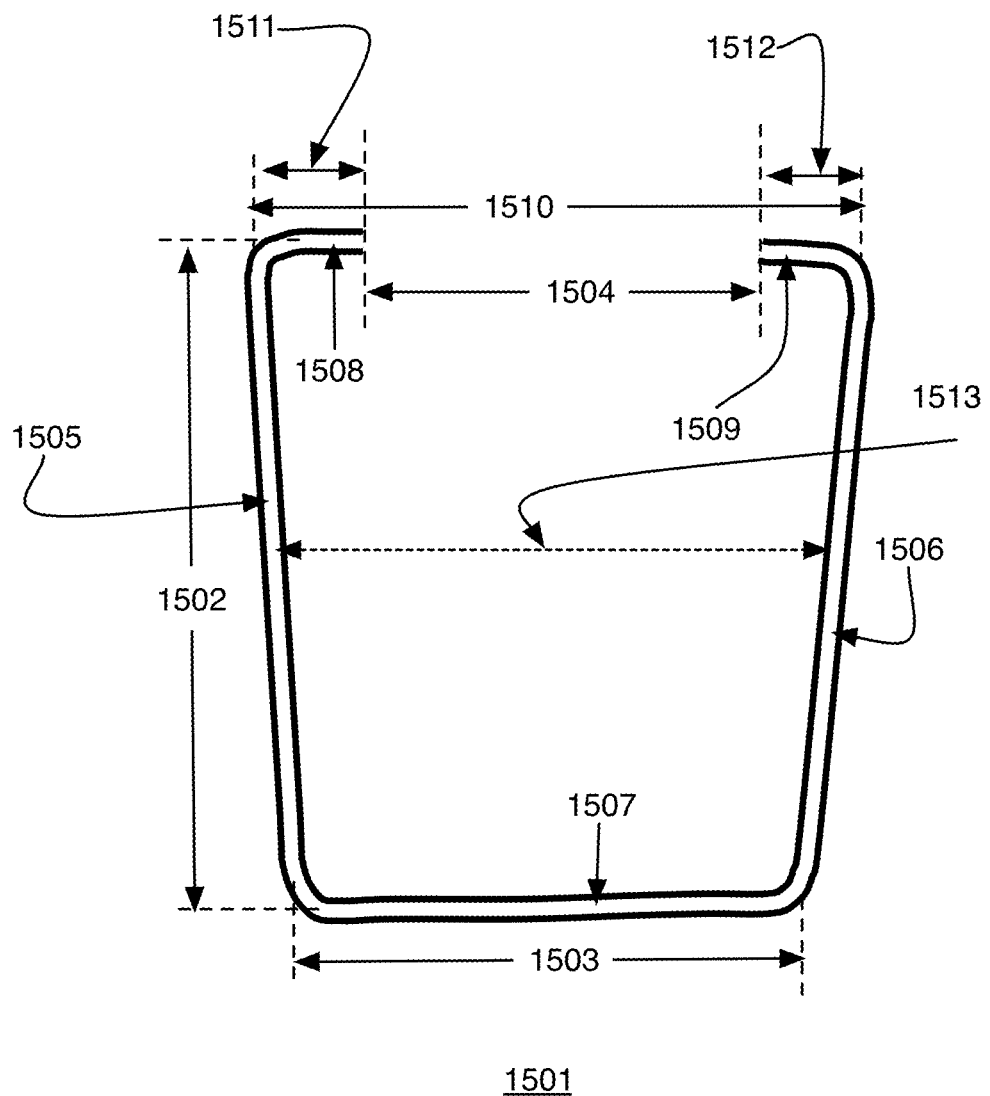
FIG. 15 shows details of the lever arm components.

Details of the lever arms of the internal spring component of the clip are shown in FIG. 15. In this embodiment, the lever arm assembly 1501 is comprised is bent into a U-shape with an additional bend to create the inserts 1508, 1509 that fit into the cylinders formed on the ends of the flat spring component discussed in the previous several Figures. The lever arms have a width 1503 at the bottom and a width 1510 at the top. In the preferred embodiment the width 1510 at the top is selected to be less than the width 805 (see FIG. 8) of the flat spring component such that when inserted into the rolled cylindrical ends of the flat spring component the lever arms must be pulled apart and released such that there is an inward tension 1513 that holds the lever arms in place attached to the formed spring component. In one embodiment, once pulled apart and inserted into the rolled cylindrical ends of the spring component, the width 1510 is sufficiently large that the lever arms may be rotated completely around the spring component. In this embodiment the interior region of the lever arms allows more room for internal components to be included in the covers as shown in FIG. 2 and also makes for a smoother surface of the covers. The distance 1504 between the insertable ends 1508, 1509 is selected in variations where the lever arms are to be interchangeable or replaceable. That is if the distance 1504 is small the lengths 1511, 1512 of the tabs 1508, 1509 are therefore longer and are inserted further into the flat spring component making removal difficult. Such a dimension would be chosen for a variation of the clip where the lever arms are not interchangeable. The lever arms further have a length dimension 1502 that is selected for the size of the clip and the covers used to encase the lever arms in the finished clip product.

Figure 16:
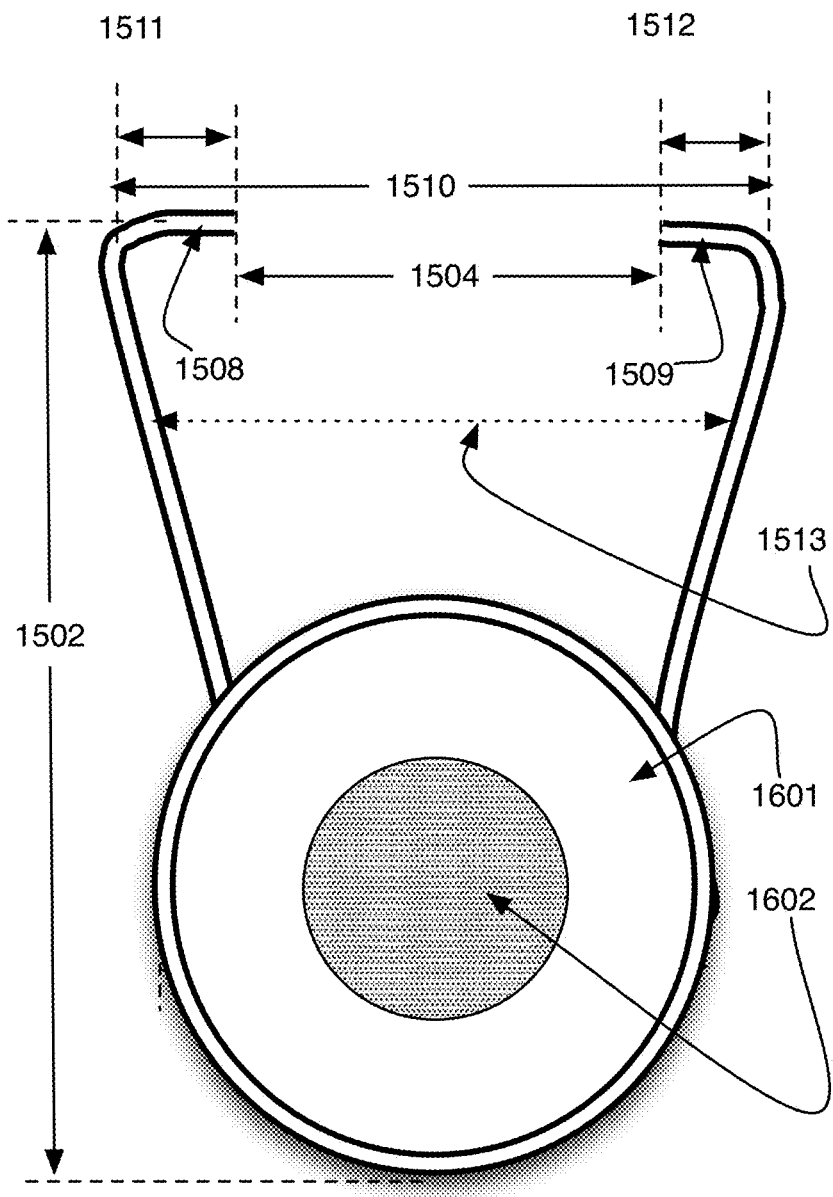
FIG. 16 shows a variation of the embodiments of FIG. 15.

The lever arms are not necessarily rectangular. For aesthetic or functional purposes the lever arms can have other shapes one of which is shown in FIG. 16. The dimensions 1502, 1504, 1508-1512 of this variation function the same as already discussed in FIG. 15 to produce a tension in the direction 1513 between the arms to hold the tabs 1508, 1509 in the rolled cylindrical ends of the flat spring component. This version of the lever arms further includes a circular medallion section 1601. The circular medallion may be selected to accommodate an advertising or decorative feature on the clip. Other shapes are equally applicable. In one embodiment the circular medallion further includes an additional component 1602. In one embodiment the component 1602 is magnetically held in place to a ferromagnetic circular section 1601. In one embodiment the circular component is a ball marker as used in the game of golf. In another embodiment the central component 1602 is an electronic component that aids in securing the clip to the person through sending an electronic alert if the clip is separated a pre-selected distance from a portable electronic device carried on the person of the user and enables locating the clip through use of GPS technology.

Figure 17:
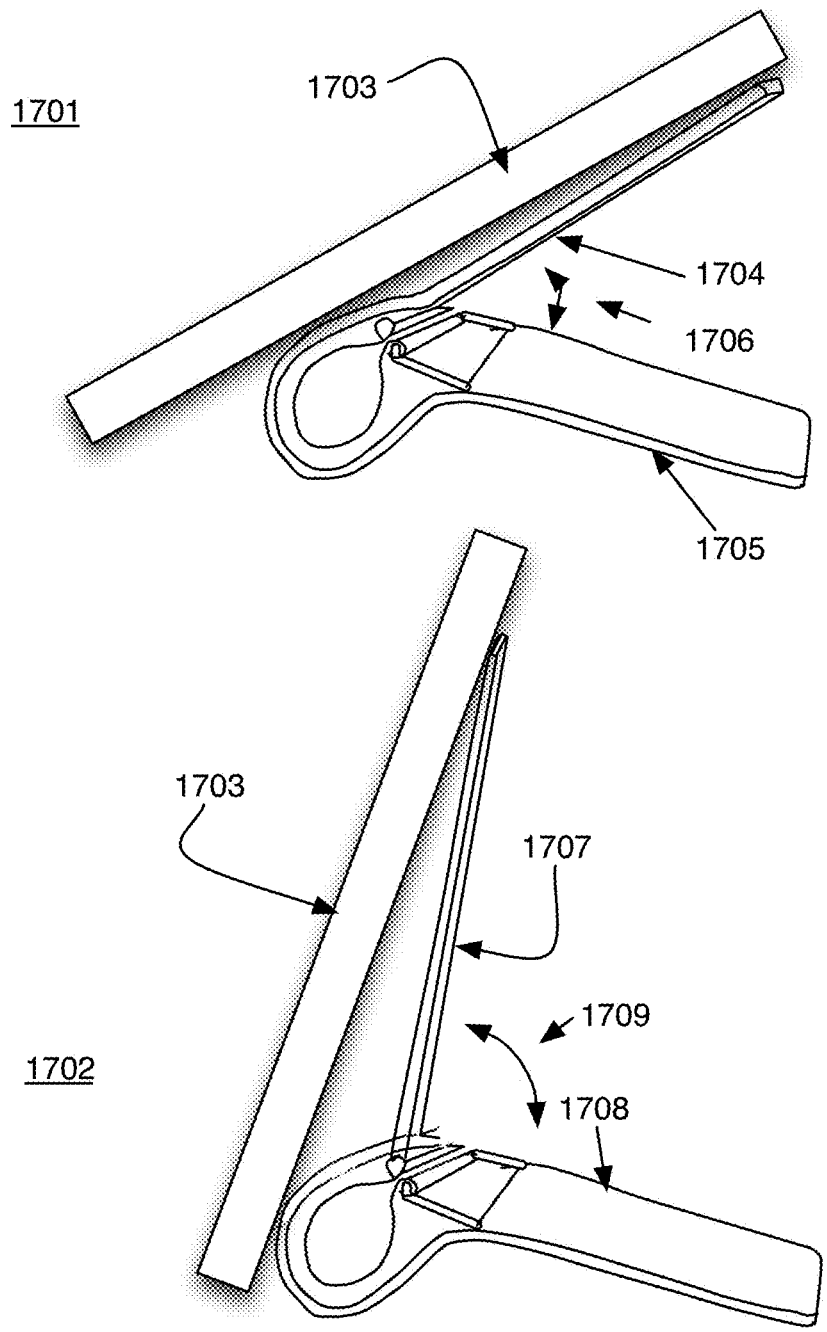
FIG. 17 shows how the invented device can be used as a stand for portable electronic device.

FIG. 17 shows two views 1701, 1702 of use of the features discussed in FIGS. 8 through 14 in controlling the angles of the lever arms to different positions by virtue of the angles of the cuts and cutouts included in the ends of the rolled portions of the flat spring component of the internal spring component of the clip. The positioning of the lever arms 1704, 1705 in the first view 1701 and the lever arms 1707, 1708 in the second view 1702 show use of the clip as a stand for a portable electronic device 1703. In the first view 1701 the device is held at an angle that facilitates viewing and typing on touch interaction with the electronic device 1703. The second view 1702 shows holding the electronic device 1703 at an angle convenient for viewing. Dimensions of the features in the regions 808, 809 (see FIG. 8 and subsequent Figures) determine either an intermediate position that may be held using either a circular cutout in the ends of the cylindrical tubes formed when the ends of the flat spring component is rolled. In the first view 1701 the lever arm 1704 is in its equilibrium closed position and the second arm 1705 is held in an intermediate position between closed and open through use of a circular cutout that removably captures the arm 1705 as it is rotated from a closed to an open position as previously discussed. The angle 1706 between the arms is determined by the location and dimensions of the features in the end of the rolled section as already discussed. In the second view 1702 both of the arms 1707, 1708 are held in an intermediate position between fully opened and closed through use of circular cutouts that removably hold the arms in place in the positions shown to create the large angle 1709 to hold the electronic device 1703 in a more upright position than is shown in the first view 1701.

SUMMARY

A clip suitable for holding money, credit cards and document is described. The clip includes features that enable use of decorative leather, cloth, rubber, polyester or polyurethane covers that can be interchanged and conceal the inner, typical metal, workings of the clip. The clip further includes features that allow control of positioning of the lever arms of the clip for ease of use as a money clip and expansion of the use as a stand for electronic devices. The present invention has been described in terms of the preferred embodiment and it is recognized that equivalents, alternatives and modifications, beyond those expressly stated, are possible and are within the scope of the attached claims.

What is claimed is:

1. A binder clip comprised of:
   a. a first and a second wire arm, identical to one another and each having two ends, and, each bent into a planar U-shape, the planar U-shape, having three closed sides formed from the wire arms and, and a fourth, open side, of the planar U-shape, including the two ends of the wire arms bent towards one another forming two wire tabs pointing towards one another leaving a gap between the wire tabs, and,
   b. a metal spring formed from an essentially rectangular sheet of metal having first and second edges, each parallel to one another, and, third and fourth edges, each parallel to one another and perpendicular to the first and second edges, and, the metal spring formed by bending the third and fourth edges of the rectangular sheet of metal towards each other to form a U-shaped spring, and, the first and second edges rolled to form a first and a second cylinder, each cylinder having two ends and an opening at each of the ends, and, the openings having an edge, and,
   c. the two wire tabs of the first wire arm are inserted into the two ends of the first cylinder, one per end, and the two wire tabs of the second wire arm are inserted into the two ends of the second cylinder, one per end, and,
   d. a flexible cover that fits over the planar U-shape of the first and second wire arms and the flat metal spring, and,
   e. when the U-shapes of each of the two wire arms are moved apart, the flexible cover contacts the U-shaped spring and acts as a fulcrum, pressing against the U-shaped spring to pry open the U-shaped metal spring, separating the first and second cylinders for insertion of an item to be held in the clip that, when the U-shapes of the arms are released, the item is then held in place between the rolled edges.

2. The binder clip of claim 1 wherein the cross-sectional shape of the U-shaped spring is one selected from circular, three-sided, four-side, five-sided.

3. The binder clip of claim 1 further including a metal mesh in the flexible cover thereby creating a faraday cage preventing radio frequency communication with the item held within the clip.

4. The binder clip of claim 1 further including a global positioning system locator that communicates the location of the binder clip to a paired electronic device via one of: Bluetooth, wifi, and near field communication radios.

* * * * *